(12) United States Patent
Block et al.

(10) Patent No.: US 7,200,894 B2
(45) Date of Patent: Apr. 10, 2007

(54) ROLLER

(75) Inventors: Wolfgang Block, Wermelskirchen (DE);
Manfred Milbredt, Remscheid (DE)

(73) Assignee: Tente-Rollen GmbH & Co.KG, Wermelskirchen (DE)

( * ) Notice: Subject to any disclaimer, the term of this patent is extended or adjusted under 35 U.S.C. 154(b) by 35 days.

(21) Appl. No.: 10/250,536

(22) PCT Filed: Dec. 10, 2001

(86) PCT No.: PCT/EP01/14465

§ 371 (c)(1),
(2), (4) Date: Jan. 16, 2004

(87) PCT Pub. No.: WO02/055322

PCT Pub. Date: Jul. 18, 2002

(65) Prior Publication Data

US 2004/0117943 A1 Jun. 24, 2004

(30) Foreign Application Priority Data

Jan. 12, 2001 (DE) ............................ 101 01 480
Feb. 8, 2001 (DE) ............................ 101 05 614

(51) Int. Cl.
*A47L 9/00* (2006.01)
*B60B 9/00* (2006.01)

(52) U.S. Cl. ...................... 16/18 R; 16/35 R; 5/86.1

(58) Field of Classification Search ............ 16/35 R X, 16/18 R, 35 B, 42 R, 42 T; 280/766.1 X, 280/124, 107; 5/86.1; 296/20; 188/1.12
See application file for complete search history.

(56) References Cited

U.S. PATENT DOCUMENTS

| | | | | |
|---|---|---|---|---|
| 3,885,353 A | * | 5/1975 | Ota et al. | 451/14 |
| 4,309,791 A | * | 1/1982 | Aulik | 16/35 R |
| 4,392,392 A | * | 7/1983 | Perisic et al. | 475/4 |
| 4,466,637 A | * | 8/1984 | Nelson | 280/766.1 |
| 4,669,484 A | * | 6/1987 | Masters | 600/486 |
| 4,998,320 A | * | 3/1991 | Lange | 16/35 R |
| 5,377,372 A | * | 1/1995 | Rudolf et al. | 5/600 |
| 5,439,069 A | | 8/1995 | Beeler | |
| 5,497,766 A | * | 3/1996 | Foster et al. | 128/200.24 |
| 5,774,936 A | * | 7/1998 | Vetter | 16/35 R |
| 5,832,780 A | * | 11/1998 | Gallienne | 74/425 |
| 5,875,681 A | * | 3/1999 | Gerrand et al. | 74/427 |
| 6,161,849 A | * | 12/2000 | Schweninger | 280/33.994 |
| 6,668,965 B2 | * | 12/2003 | Strong | 180/411 |

FOREIGN PATENT DOCUMENTS

| | | |
|---|---|---|
| DE | 3839433 | 10/1989 |
| DE | 4318546 | 12/1994 |
| DE | 4412603 | 10/1995 |
| EP | 0558108 | 9/1993 |
| IT | 0124141 A1 * | 11/1984 |

* cited by examiner

*Primary Examiner*—Brian E. Glessner
*Assistant Examiner*—Mark Williams
(74) *Attorney, Agent, or Firm*—Martin A. Farber

(57) ABSTRACT

Roller (1), particularly a castor-type roller, with rotational movement of a running wheel (12), with an operating shaft (20) which passes through a control cam (19) of the roller (1) and on which an electric motor (37) acts via a gear mechanism to operate it, wherein the electric motor (37) acts on the operating shaft (20) by means of an electric motor shaft (39) via a toothed gear mechanism (38), the toothed gear mechanism (38) having a driven gear wheel (41), a hub (40) of which is passed through by the operating shaft (20).

30 Claims, 11 Drawing Sheets

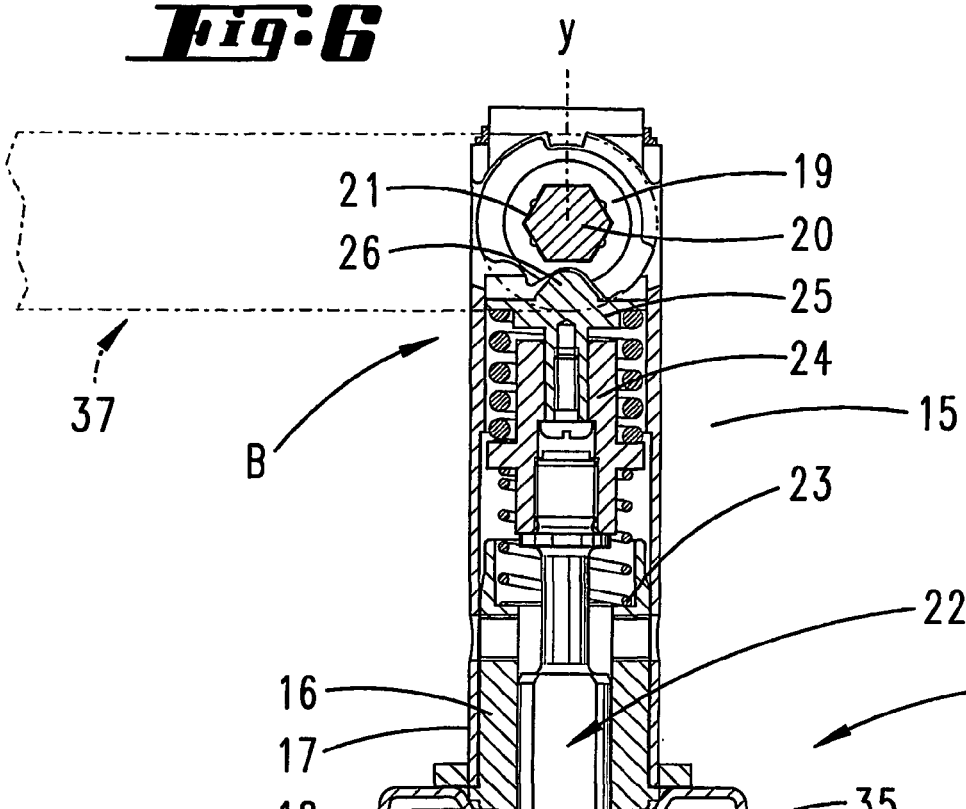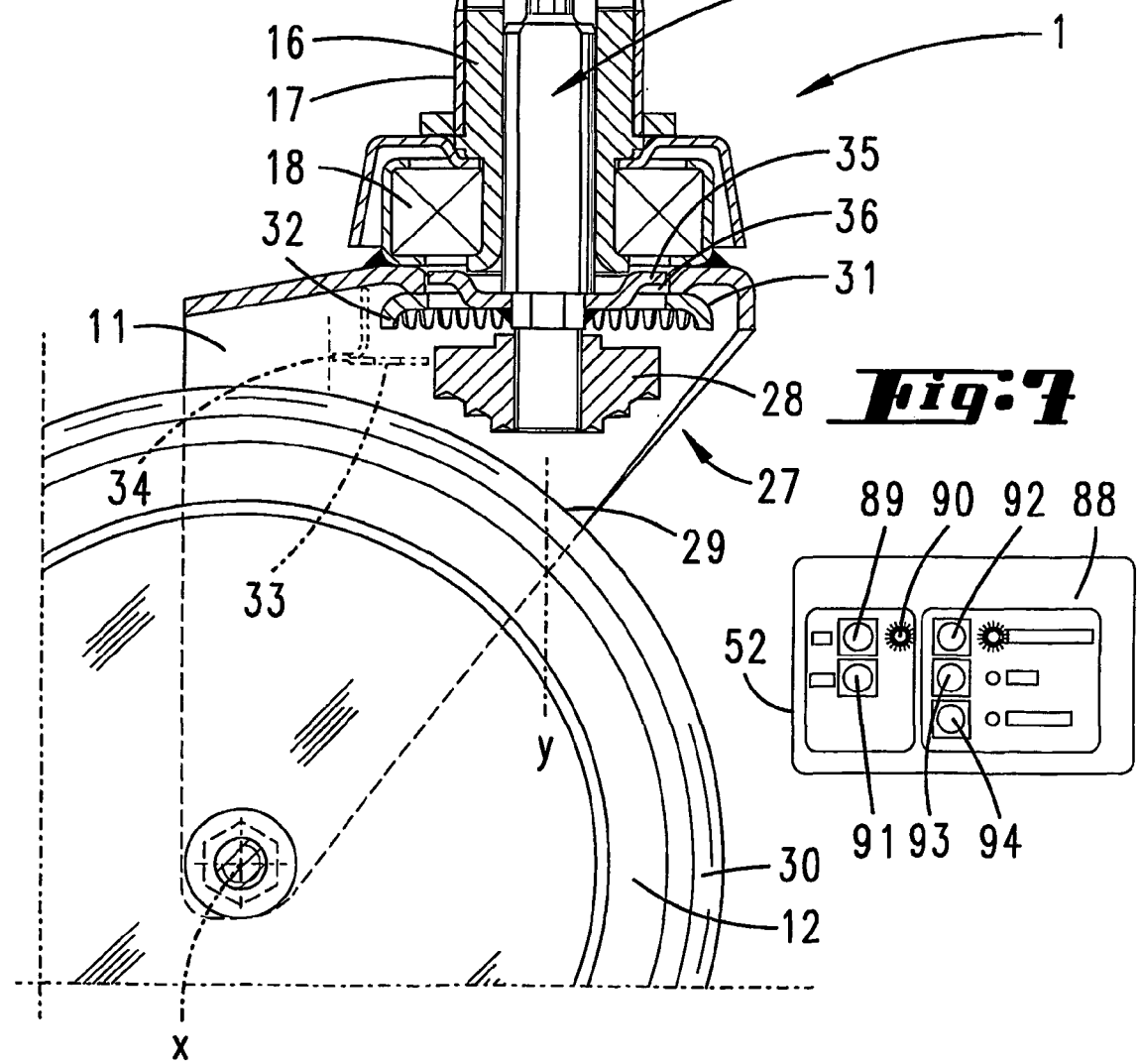

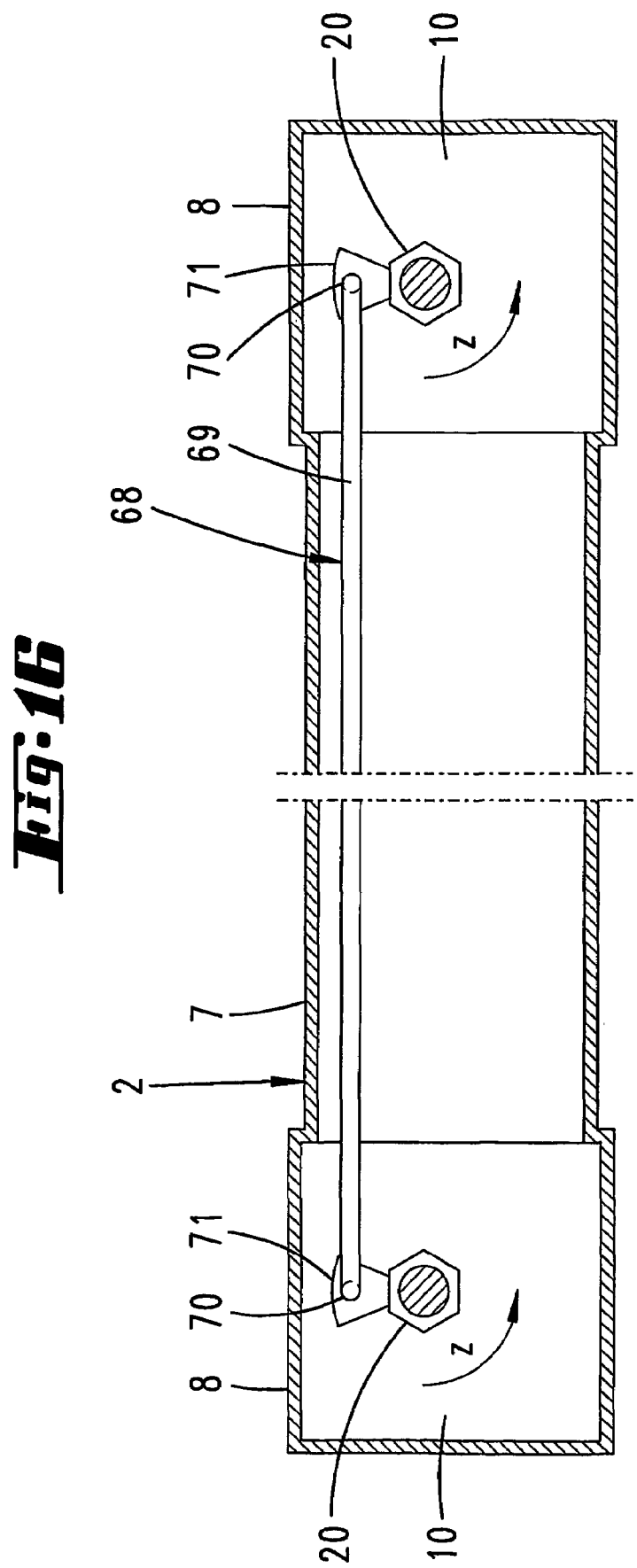

ROLLER

FIELD AND BACKGROUND OF THE INVENTION

Figure 1:
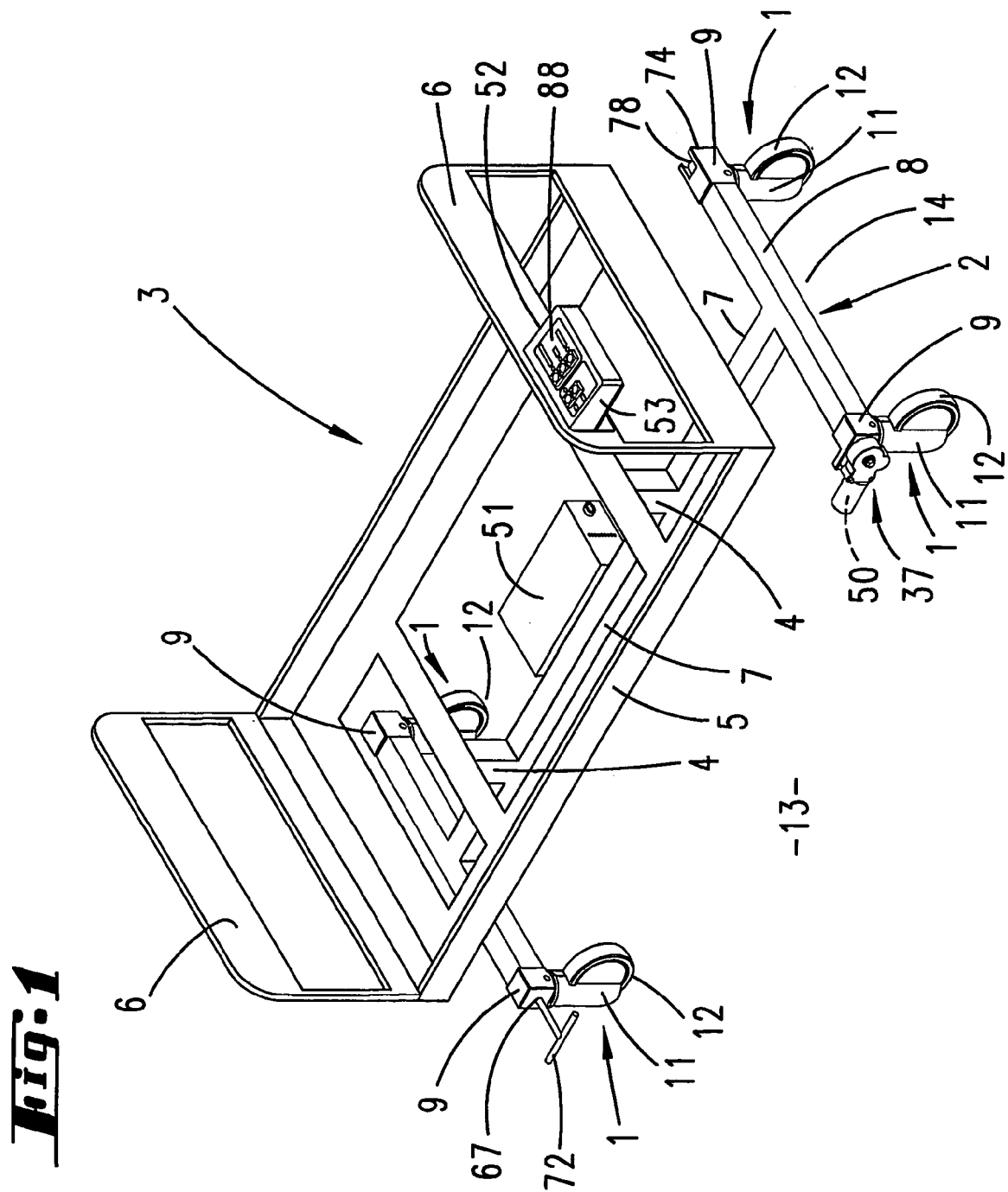

The invention relates to a roller, in particular a castor-type roller, with the rotational movement of the running wheel and optionally the pivoting movement of the running wheel being fixable, with an operating shaft which passes through a control cam of the roller and on which an electric motor acts via a gear mechanism to operate it.

A roller which can be switched by means of a rocker pedal with a view to being able to fix the rotational movement of the running wheel and the pivoting movement is disclosed by U.S. Pat. No. 5,377,372. The pedal extends in the center of the chassis of a movable bed. This produces a quite complicated transmission mechanism with respect to the rollers.

It is already known from DE-A1 43 18 546 to use an electric motor to control an operating shaft passing through a control cam of the roller. The electric motor and gear mechanism are aligned in such a way as to extend a push rod, which turns the operating shaft via an articulated pivot lever and consequently turns the control cam, by which the described functions are performed. Here, too, a not inconsiderable complexity is involved.

SUMMARY OF THE INVENTION

The object of the invention is to make the functionally related operation of the roller more advantageous in terms of how it operates, more simple in terms of how it is constructed and nevertheless reliable in terms of its use.

This object is achieved in the first instance, it being provided that the electric motor acts on the operating shaft by means of an electric motor shaft via a toothed gear mechanism. In technical switching terms, there is an advantageous direct effect. The transmission mechanism described is no longer needed. The structural complexity is reduced, a further reason for that being that the toothed gear mechanism has a driven gear wheel, the hub of which is passed through by the operating shaft. For rotational driving with respect to the control cam, it is then provided that the operating shaft has a polygonal cross-section. Such an unround polygonal cross-section is suitably a hexagon. Correspondingly or preferably, the hub has an internal cross-section that is adapted to the polygonal cross-section of the operating shaft. It is further realized that the toothed gear mechanism has a worm, which drives the driven gear wheel via step-down intermediate gear wheels. The take-off from the worm can then take place from two sides, directly or diametrically offset. This produces an advantageous force transmission without overloading; the forces on the worm, in the form of counter-directed radial components, cancel one another out, as it were. In this case, it is additionally advantageous that the axis of rotation of the worm is in line with the axis of rotation of the electric motor shaft. This provides a compact construction. In technical switching terms, it is advantageous with regard to the functions of the roller if the operating shaft is displaceable in relation to the hub in the longitudinal direction of the operating shaft of the driven gear wheel. This permits disengaging movements on the electric motor side with respect to the rotational driving, that is to say forms an advantageous basis for performing or decoupling the functions. A structurally advantageous solution is then obtained by an operating shaft passing through the control cams of two rollers disposed at a distance from each other. This produces a synchronous operation of neighboring rollers. In order in this respect to reach all four rollers, for example of a chassis of a bed, synchronously in switching terms by simple means, it is proposed that two operating shafts which are coupled via a drive mechanism for the simultaneous switching operation of three or more rollers by an electric motor are disposed parallel to each other. The corresponding switching member may be embodied in the form of a push rod. It is also taken into account in respect of the motor that the fixed electric motor has an electric motor shaft extending at right angles to the plane of the operating shaft. The said electric motor shaft generally also determines the lengthwise shape of the entire casing, lying in this direction. This kind of use, chosen to act like a pointer, is at the same time of fundamental significance for additional functions, all the more so since the winding region (stator winding) of the electric motor is disposed a handwidth away from the operating shaft. This gives the electric motor the status of a handle, in that it is further provided that the casing of the electric motor going over into the winding region is formed such that it projects freely in the manner of a handle. Once released, it can be turned and consequently used as a switching lever for the different functions. It is therefore also advantageous if the electric motor is associated with an extreme end of the operating shaft. For good operating accessibility, it proves to be useful for the electric motor to be disposed, for example with respect to a setup in a hospital bed, on the outside of the bed in relation to a roller. This means the outline of the bed, or hospital bed, determined by the bed frame. In order on the other hand to avoid an exposed position of the electric motor, it is proposed that the electric motor is disposed with respect to a setup in a hospital bed on the inside of the bed in relation to a roller. Both the mutual association and the step-down referred to also allow a function of independent significance, in that the electric motor is disposed rotatably with the operating shaft for emergency operation. In other words: the toothed gear mechanism of the electric motor is self-locking from the driven gear wheel. Performance of emergency operation requires deliberate release of the pivotability of the electric motor. In a corresponding way, secure mounting of the same can be relinquished for emergency operation. For this purpose, the chassis of the hospital bed is used. This precaution is of such a kind that a spring pin engaging in a fixed bearing bore is provided for fixed mounting. Release is confined to pulling the spring pin, which consequently leaves the fixed bearing bore and again enters the fixed bearing bore in the opposite direction, with snapping engagement. The performance of the functions of the roller is brought about by means of sensor-controlled electrical effects. For this purpose, it is provided that on the operating shaft there are circumferentially distributed position indicators, which pass contactlessly over a position sensor for detecting a switching position of the operating shaft. The position indicators are in this case formed as a magnet. The position sensors, on the other hand, are provided by proximity switches. It is advantageous here in technical assembly terms if the position sensors are accommodated in a common circuit board. The highly stepped-down electric motor allows small, defined angular movements. In view of the functions of pivoting blockage (directional fixing), release position, braking and pivoting blockage (total blockage), it is advantageous if three position indicators are provided and they are disposed within a circumferential range, covering the entire turning angle, of 180° or less. Furthermore, it proves to be advantageous that two or more, preferably all, of the rollers are intended for joint operation and that each roller has an associated operating shaft of its own and an associated electric motor of its own, the operating of the electric motor taking place via a central control unit, which is in operative connection with each of the electric motors. Returning to the position indicators, it is structurally advantageous for them to be disposed with a spacing from one another over the length of the operating shaft. This means over a relatively short section of the length of the operating shaft. In terms of how they are associated with one another, in practice a smaller segment of a circle is sufficient, since, according to an exemplary embodiment described below, the three position indicators are disposed within a circumferential range of 90°, which can even be reduced to 60°. A variant of the means for emergency release is then also embodied by the operating shaft having over its length not only an engaging portion, with which the toothed gear mechanism interacts, but also a release portion and by the operating shaft being displaceable in its longitudinal direction in relation to the toothed gear mechanism, so that, for emergency operation, the release portion can be brought into association with the toothed gear mechanism. A still more simple solution is that an extreme end of the operating shaft is provided with a manual operating handle. This engagement takes place in this case by the operating shaft being axially movable against spring force by means of the manual operating handle.

The invention then also relates to a roller wherein a control device and a storage battery also being provided, which solution is characterized in that the power supply to the control device is switchable by the storage battery and in that, following operation of the roller, to be triggered by means of the switching device, the switching device completely interrupts the power connection to the storage battery. Moreover, it is taken into account that, for carrying out an operation of the roller by means of the switching device, separate activation of the power supply of the switching device has to be carried out. With activation of the power supply to the switching device, an indication of the operating state of the roller takes place. In this way, the current function is in each case perceptible, and correspondingly also the new function. Finally, the invention proposes for the switching units of the switching device to be disposed on a common circuit board, which switching circuit board can also, optionally, be integrated into an existing switching unit of the hospital bed. Finally, it is provided that the position sensors are disposed with a spacing from one another over the length of the operating shaft.

Figure 2:
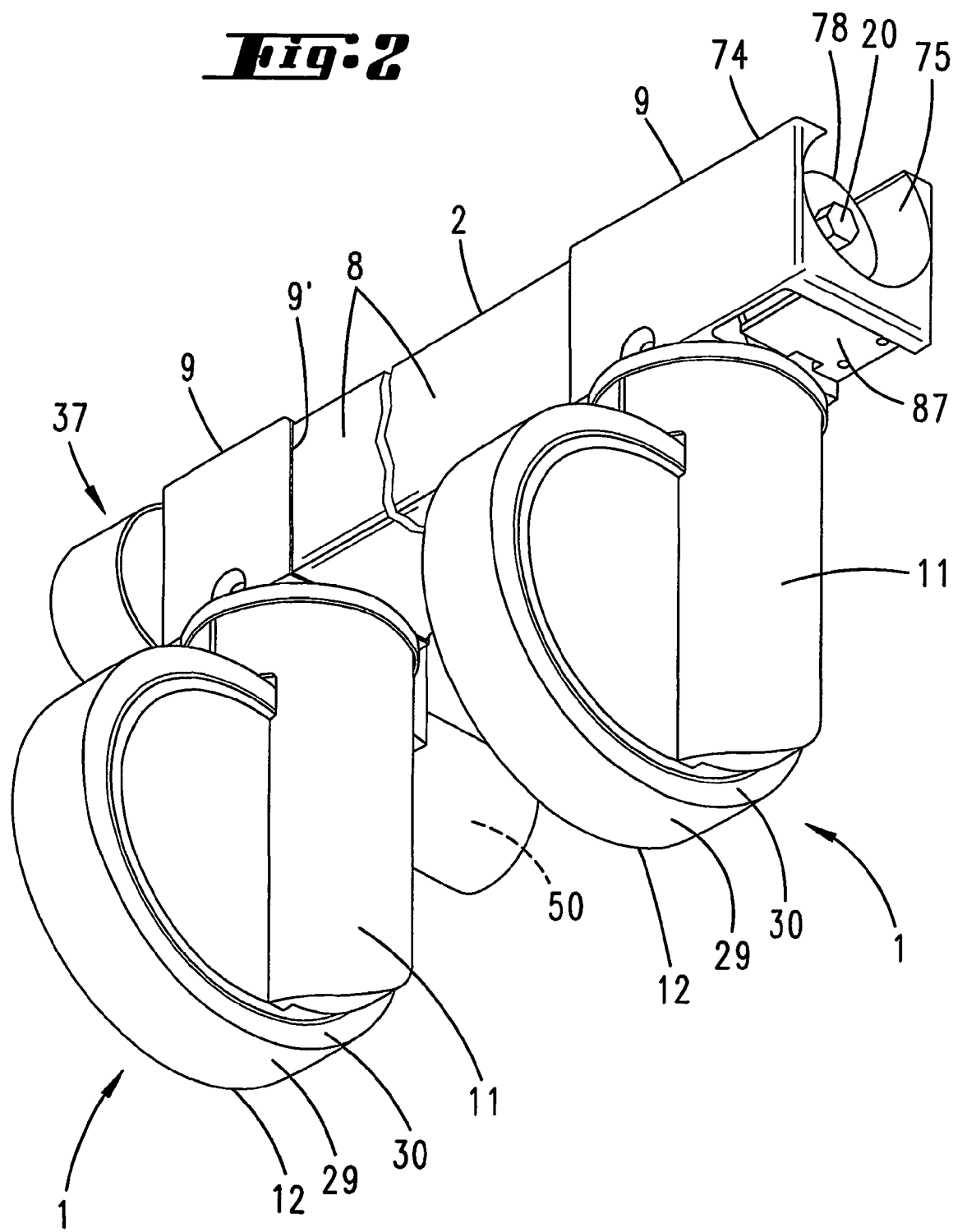
Figure 3:
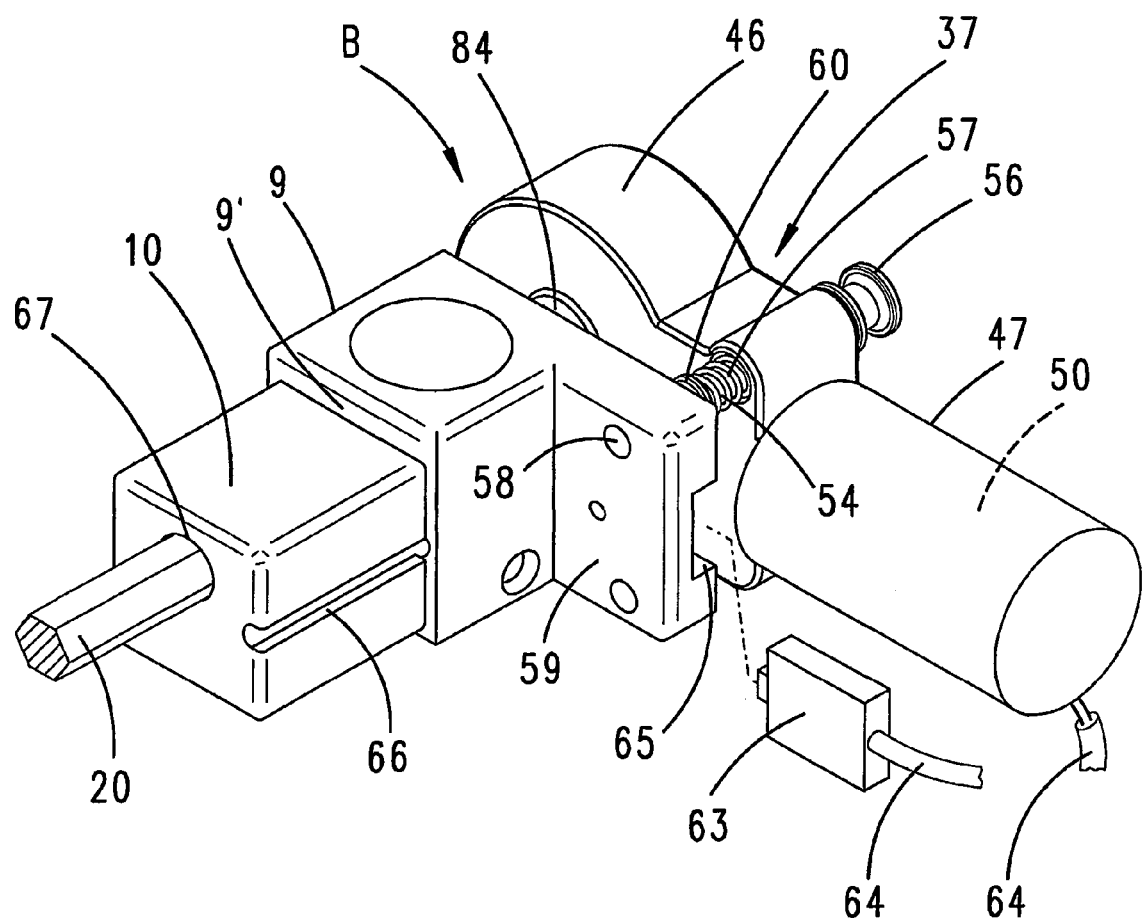
Figure 4:
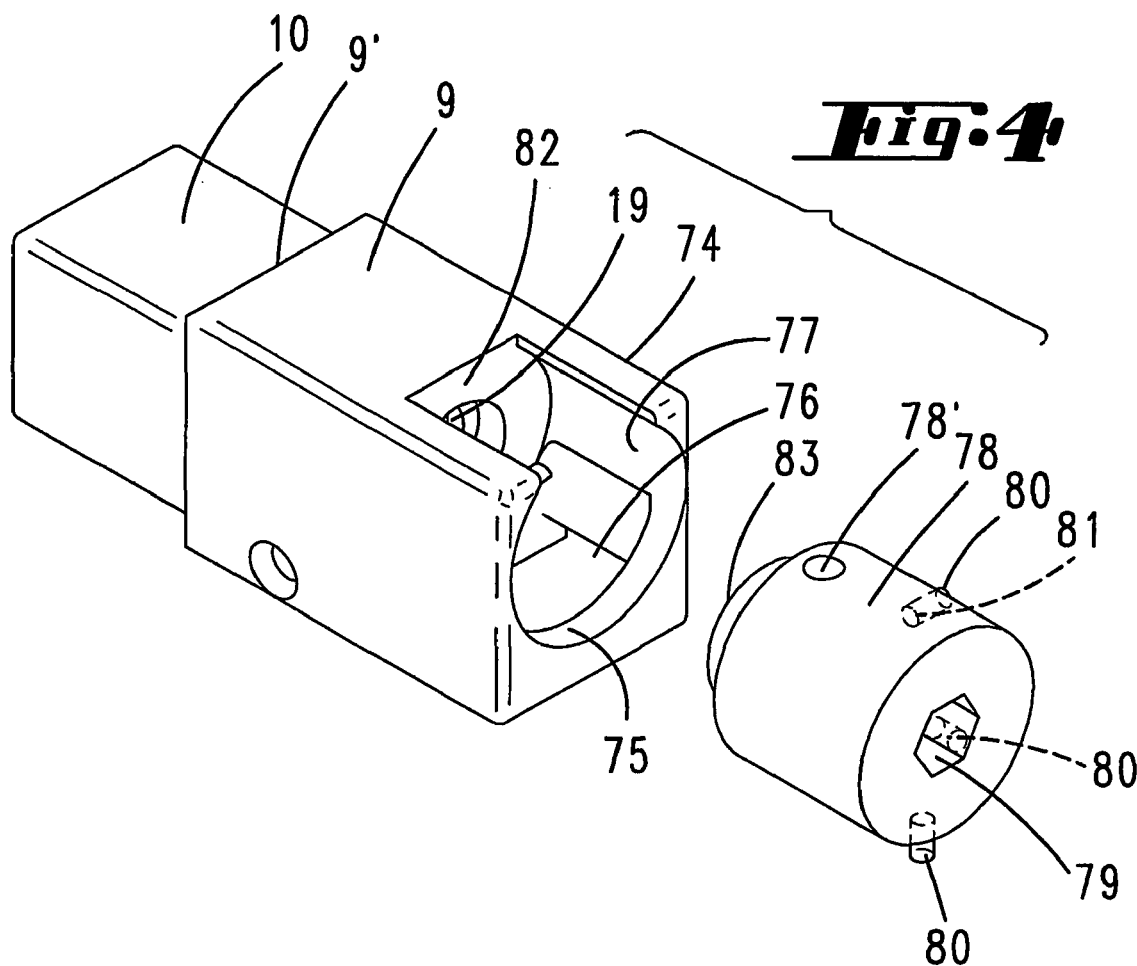
Figure 5:
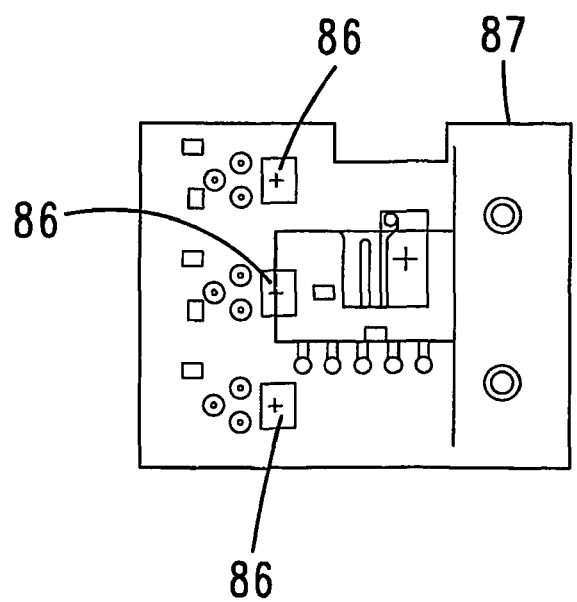
Figure 8:
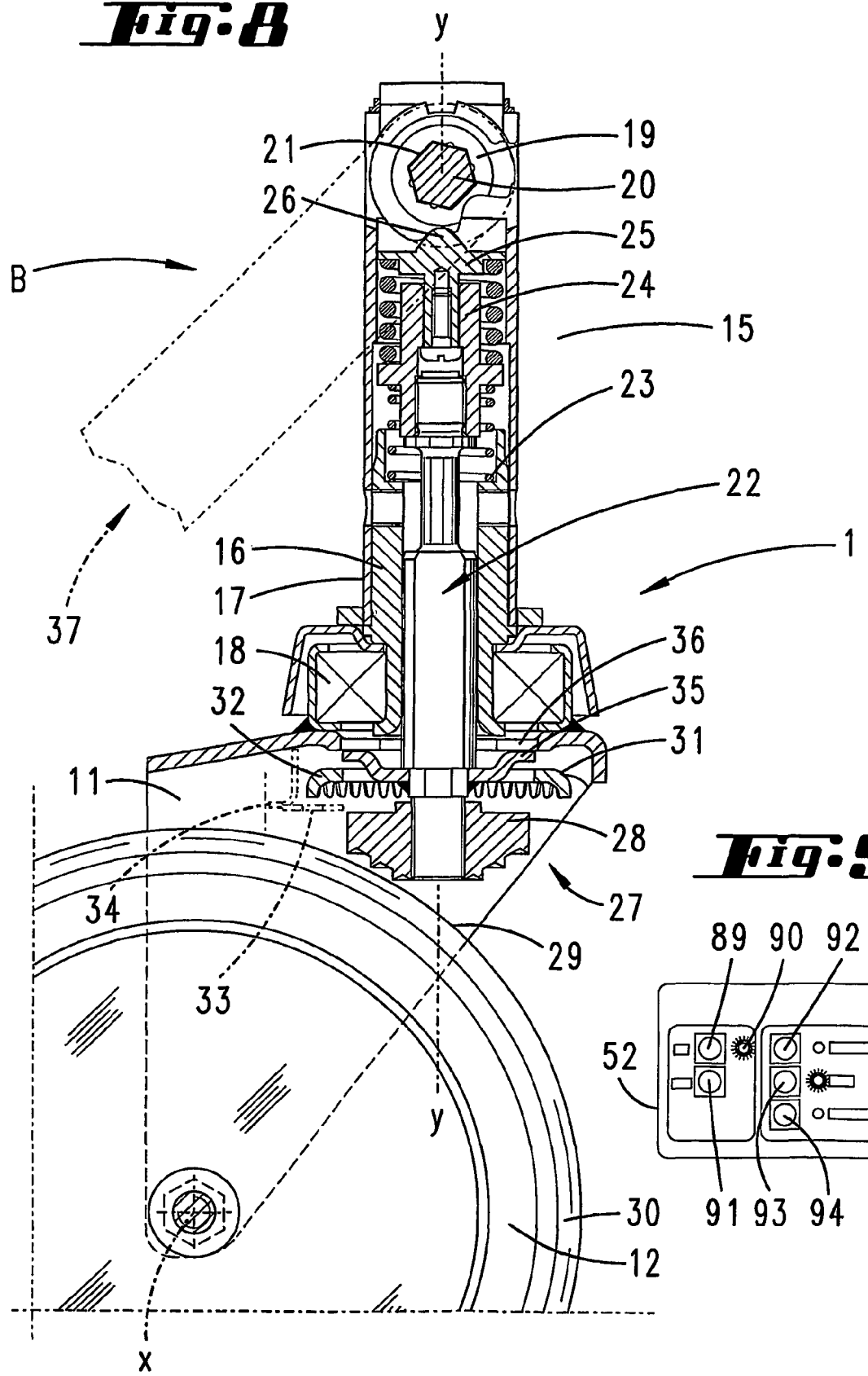
Figure 9:
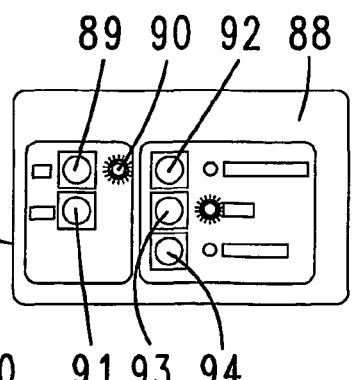
Figure 10:
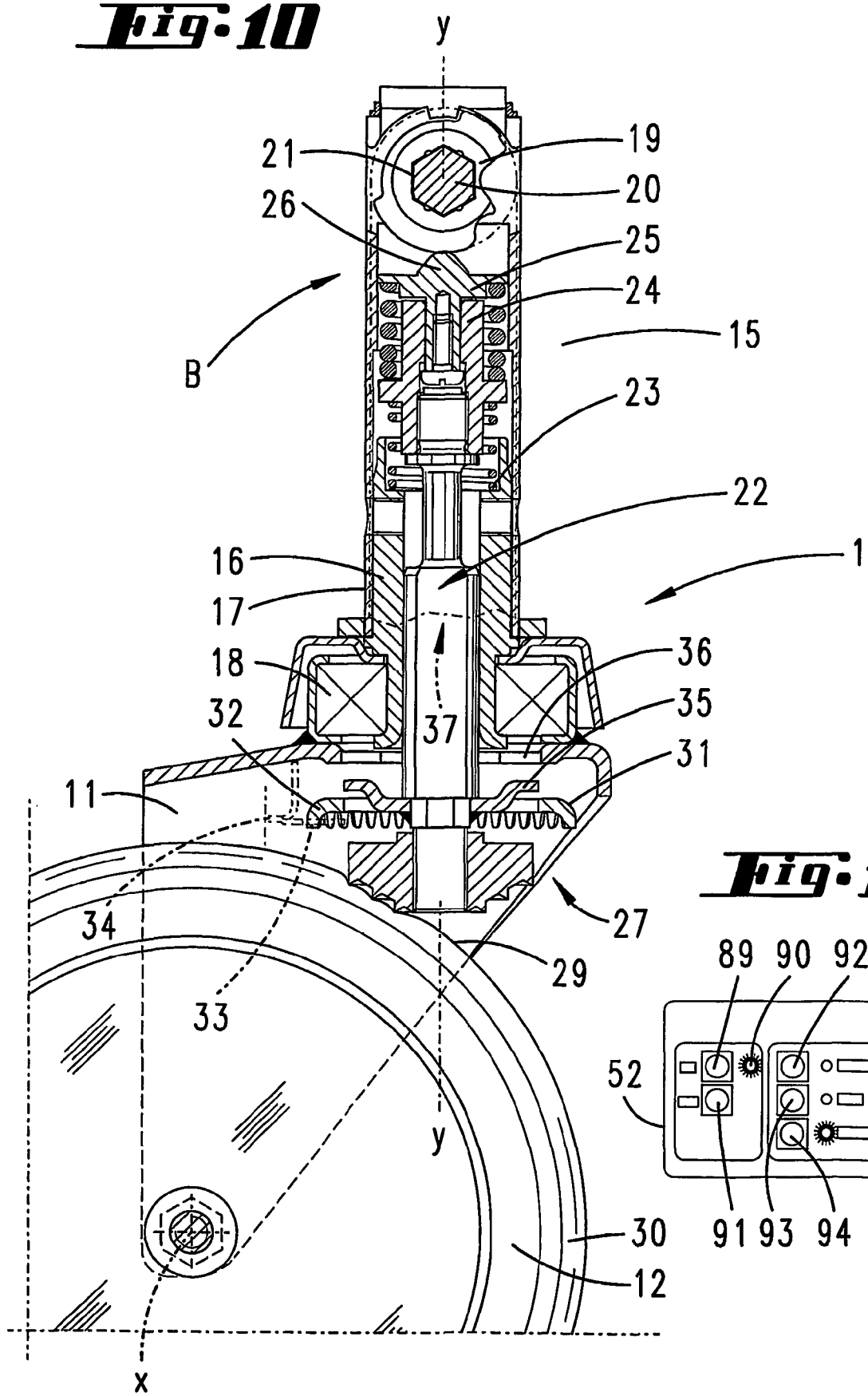
Figure 11:
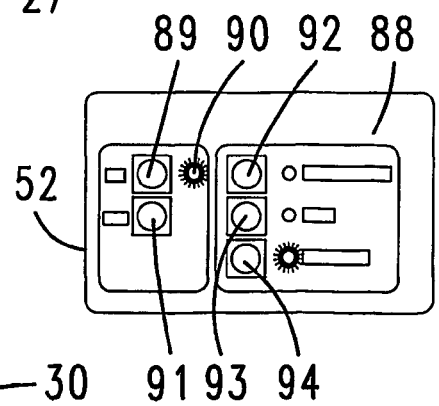
Figure 12:
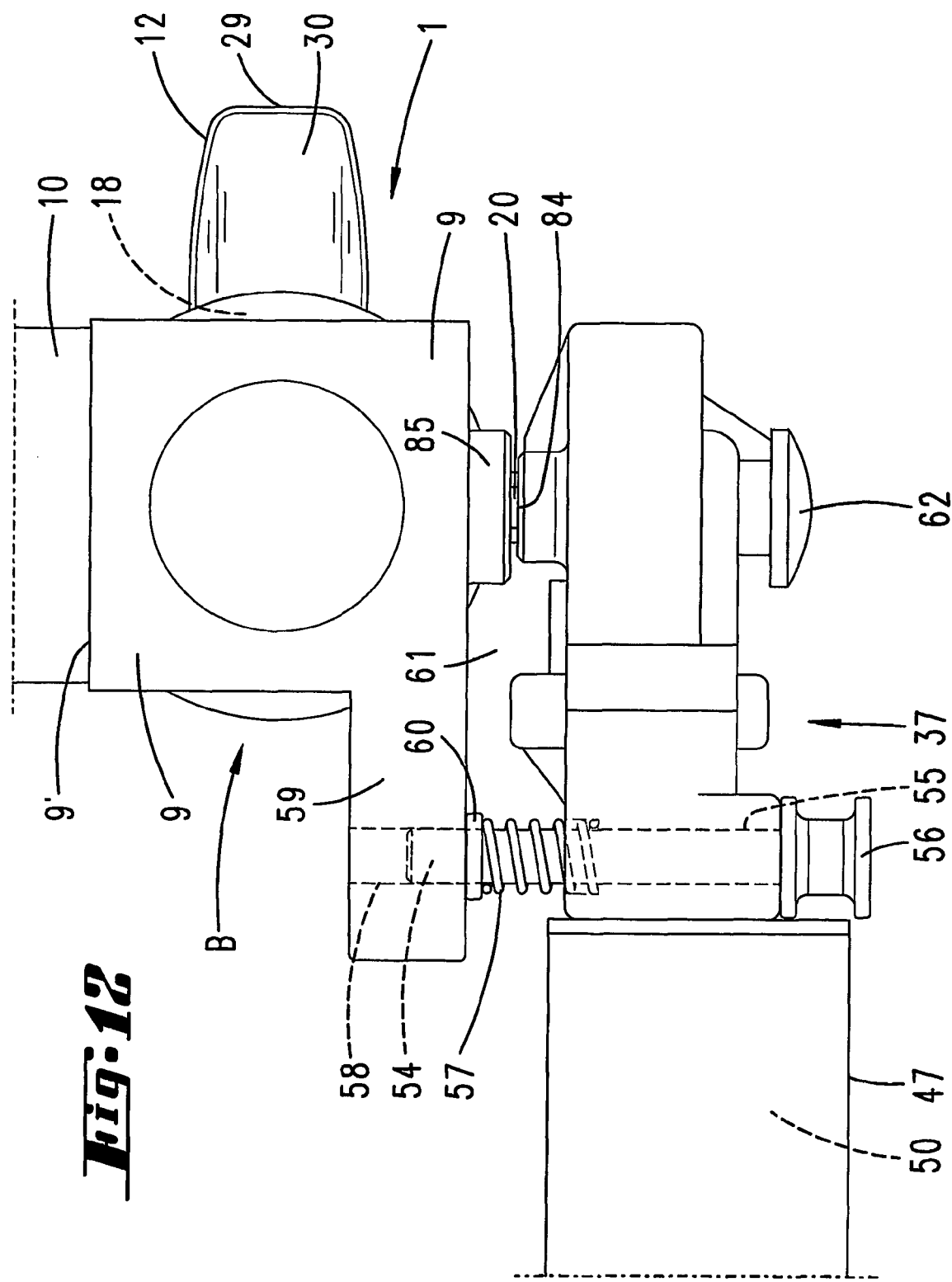
Figure 13:
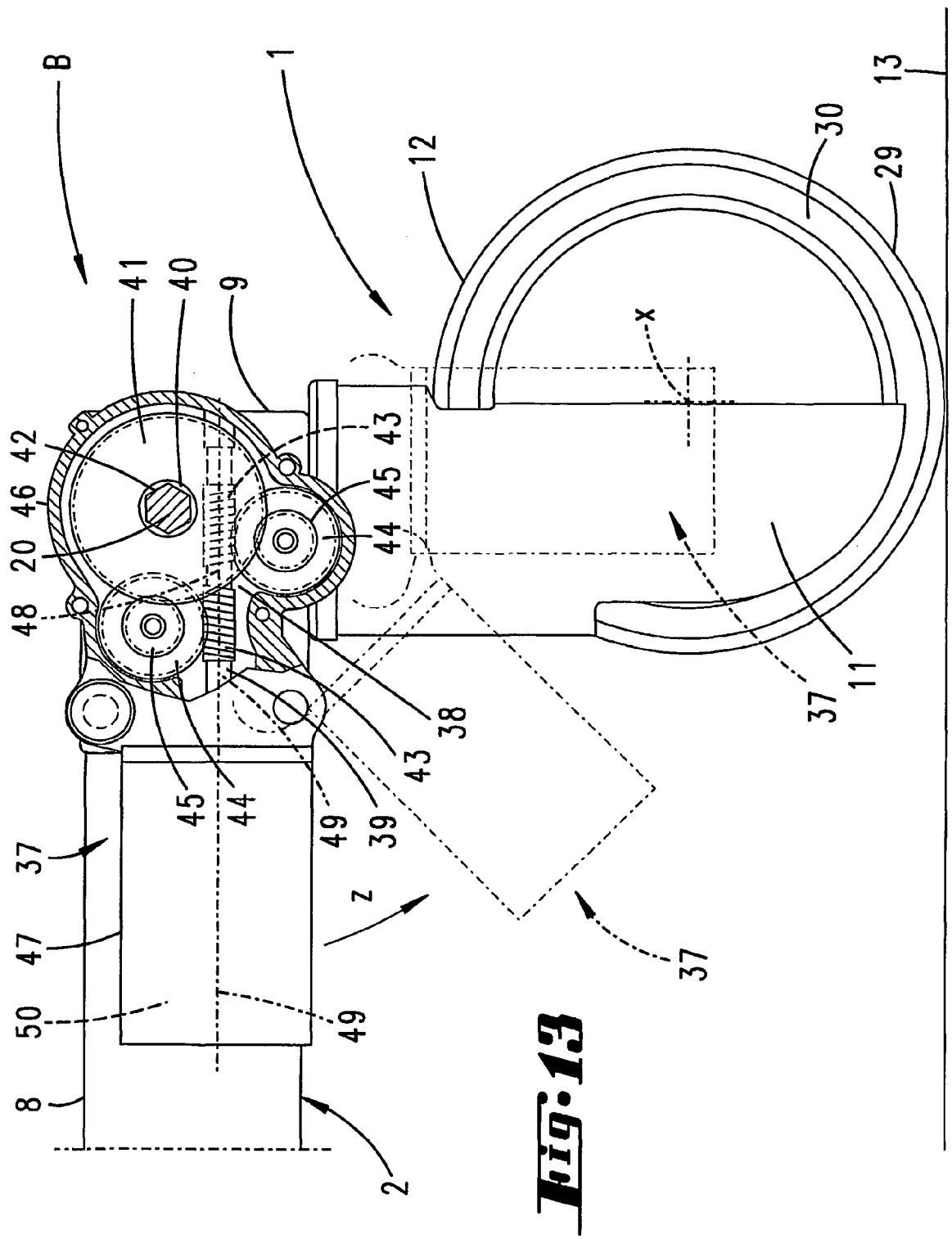
Figure 14:
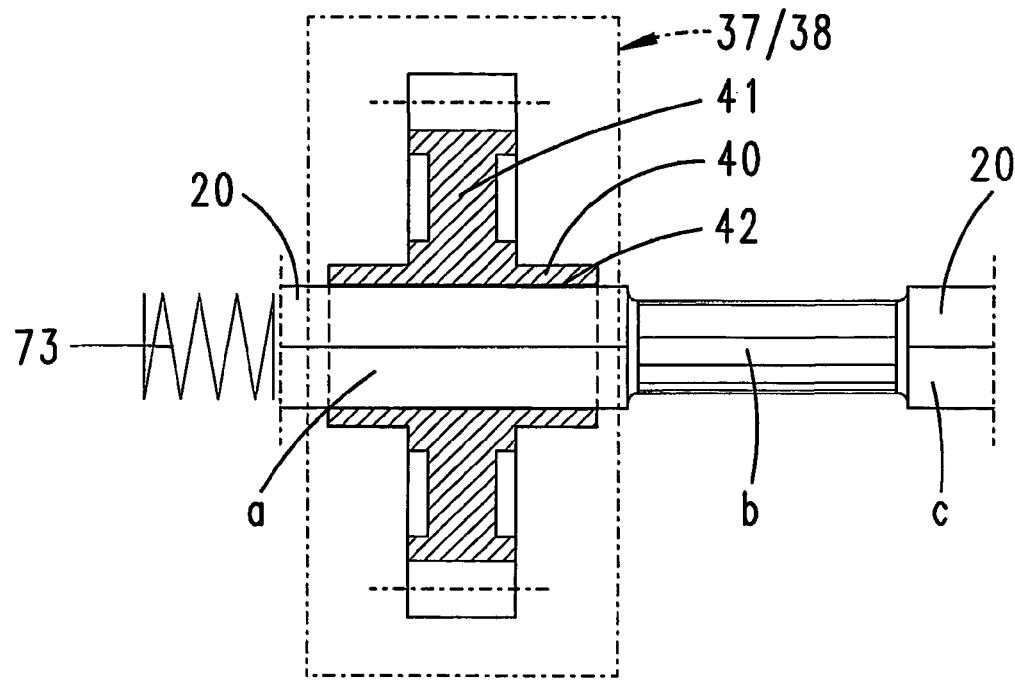
Figure 15:
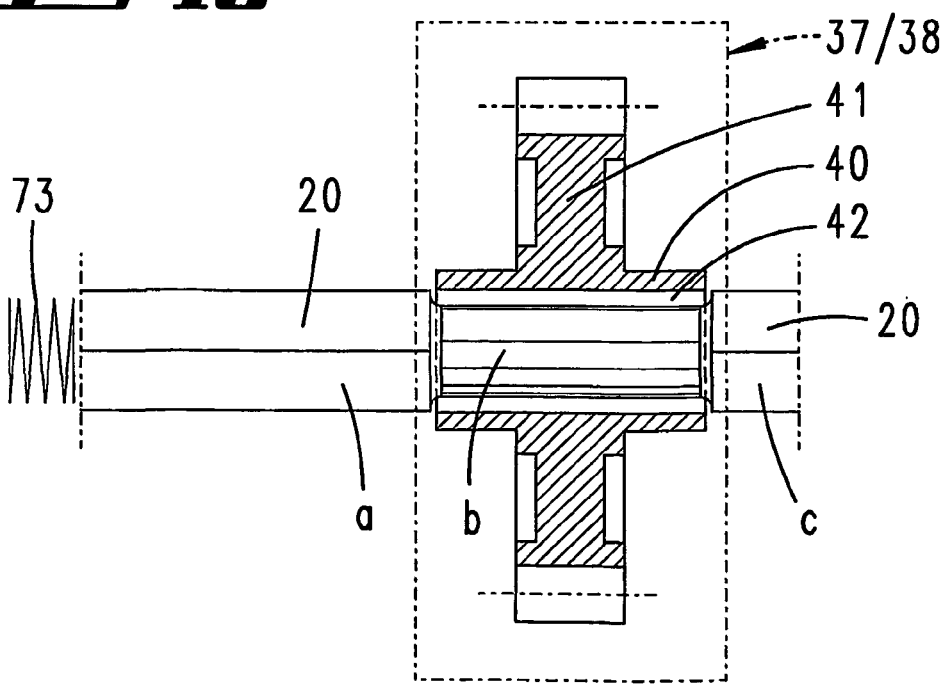

The subject matter of the invention is explained in more detail below on the basis of an exemplary embodiment represented in the drawing, in which:

FIG. 1 shows, in a perspective representation, a movable hospital bed using the rollers according to invention, one being fitted with an electric motor, FIG. 2 shows a perspective view from below of one end of the chassis of the hospital bed, FIG. 3 likewise shows, in a graphic representation, the electric motor, associated with a carrier which can be connected to the chassis, FIG. 4 shows the carrier on the other side, with a roll, with which position indicators are associated, FIG. 5 shows a plan view of the associated circuit board, carrying associated position sensors, FIG. 6 shows a vertical section through the roller in the pivoting blockage position, FIG. 7 shows the front plate, visually showing this position, of a control device in switch operation, FIG. 8 shows a section like FIG. 6, showing the release position, FIG. 9 shows the front plate, visually showing this position, of the control device in switch operation, FIG. 10 shows a section like FIG. 6, showing the braking and pivoting blockage of the roller, FIG. 11 shows the front plate, visually showing this position, of the control device in switch operation, FIG. 12 shows the plan view of the roller with the electric motor securely mounted, FIG. 13 shows a view toward the roller with the casing of the gear mechanism partially broken open, FIG. 14 shows a vertical section through the driven gear wheel with the operating shaft, FIG. 15 shows a representation corresponding to FIG. 14 with the operating shaft disengaged, and FIG. 16 shows a drive mechanism transmitting the switching action, schematized to the greatest extent.

DETAILED DESCRIPTION OF THE PREFERRED EMBODIMENT

The roller 1 according to the invention is formed as a castor-type roller and is associated with the four corners of a traveling mechanism. In the case of the exemplary embodiment represented, this is a chassis 2 of a hospital bed 3.

The chassis 2 is in connection with a bed frame 5 by means of column pieces 4. The said bed frame finishes at the head and foot with vertically rising boards 6.

The bed frame 5 may be divided, so that frame parts can be adjusted and fixed in relation to one another, for example to achieve specific bed profiles (these means are not represented).

The chassis 2 is assembled from box sections. The box section material comprises a beam 7, as a T bar, and arms 8, crossing the latter at the end before the head, comprising the T cross-pieces.

The rollers 1 are associated with the free ends of the arms 8 by means of a horizontally insertable carrier 9. The insertion connection is reversible and secured by a transverse pin. The insertion projection has the reference numeral 10. It is offset by the wall thickness of the box section and moreover made to match the clear cross-section of the same, and is therefore directionally stable, i.e. rotationally secured. The shoulder 9', formed by the wall offset, between the carrier 9 and the insertion projection 10 acts as an insertion limitation.

From the underside of the carrier 9 there extends a pivotably mounted wheel fork 11. Axle-mounted on it is a running wheel 12. The wheel fork 11, with a wheel projection extending to the running surface 13, establishes a freely accessible low-level region 14 of the chassis 2. The height achieved is sufficient for example for floor cleaning operations.

As can be seen for example from FIGS. 6, 8 and 10, the roller 1 continues on the upper side into a vertically aligned superstructure 15. Such a roller 1 is the subject of DE-A1 44 12 603 and is to be described here to explain the technical functions. Nevertheless, this roller can be formed in a more compact manner, or this is even the aim, so that the corresponding mechanism is accommodated in the carrier 9 as a casing (compare for example FIG. 1). The roller is secured by a holding screw. The screw hole in the carrier 9 is revealed in the drawing.

The roller 1 performing the functions, represented in FIGS. 6, 8 and 10, is mounted axially offset vertically with respect to the horizontal running-wheel axis x, to permit the pivoting movement of the running wheel 12, or of the wheel fork 11. The vertical axis is designated by y.

Extending from the wheel fork base, in the upward direction, is a vertically aligned carrying pin 16. The latter is surrounded by a sleeve 17, which is mounted in a receptacle of the carrier 9. They are associated with each other in such a way as to be rotationally fixed. The casing of the carrier 9 may also itself assume the function of a sleeve.

With a ball bearing 18 interposed, the wheel fork 11 is rotatable with respect thereto, so that the pivoting movement mentioned of the running wheel 12 is obtained.

The upper end of the sleeve 17, optionally directly of the carrier 9, accommodates a control cam 19 aligned transversely to the vertical. Its center is passed through by an operating shaft 20. The latter has a polygonal cross-section. A hexagonal cross-section is represented. The passage cross-section 21 of the center is made to match, that is hexagonal.

Inside the hollow carrying pin 16 there is a push rod 22 extending vertically, but rotationally secured. It is displaced in the direction of the running wheel 12 when there is rotational displacement of the control cam 19. This takes place counter to the force of a compression spring 23. The latter acts as a return spring. The compression spring acts against a thrust piece 24 screw-connected to the push rod 22.

The upper side of the thrust piece 24 terminates with a plate 25. The latter engages the notch-contoured circumference of the control cam 19 with a tooth 26. The tooth 26 impinges perceptibly on gaps of different depths and on a circular arc portion of the control cam 19. Following the contour of the latter, beyond the basic position represented in FIG. 8 there occurs a blockage of the rotational mobility of the running wheel 12 and/or of the pivoting movement of the running wheel 12, to be more precise of the wheel fork 11. The stated positions are respectively defined by the support at the top.

Between the plate 25 of the described operating device B and the thrust piece 24, loaded by the compression spring 23 in the direction of the plate 25, there is a force accumulator, realized as a screw-thread compression spring, with central thread-adjusting means. This can be used to set the pressing-in resistance of the braking means. However, these means are not the subject of the present patent application. They are disclosed in detail by DE-A1 44 12 603.

At the lower end of the push rod 22 there is a braking device, designated as a whole by 27. To stop the running wheel 12, a braking part 28 seated at the lower end of the push rod 22 engages in the running surface 29 of a flexible tire 30 of the running wheel 12. You are referred to FIG. 10.

Serving to block the pivoting movement of the wheel fork 11 is a toothed rim 31, installed behind the braking part 28. The said toothed rim is seated unrotatably on the vertically displaceable push rod 22. Its downwardly pointing teeth 32 act together with tooth gaps 33 of a resilient blocking element 34 of the wheel fork 11, which allows the teeth 32 to spring into the said gaps. Entering these tooth gaps 31, the pivoting movement of the wheel fork 11 is consequently blocked at the same time as and along with the stopping of the rotational movement of the running wheel 12.

On the other hand, however, the pivoting movement of the wheel fork 11 can also be blocked alone, since the upper side of the toothed rim 31 has blocking projections 35, which can engage in matching depressions 36 of the fork base. In this situation, the push rod 22 assumes its highest possible displacement position. You are referred to FIG. 6.

The main element of the operating device B is an electric motor 37. The electric motor 37 has a highly stepped-down toothed gear mechanism 38. This mechanism acts directly with the operating shaft 20, which is connected to the control cam 19 in a rotationally fixed manner.

As FIG. 13 reveals particularly clearly, the electric motor 37 acts by means of an electric motor shaft 39 via the toothed gear mechanism 38 on the end there of the operating shaft 20, freely projecting correspondingly with respect to the carrier 9. The end, or extreme end, of the operating shaft- 20 has the same described polygonal cross-section as the passage cross-section 21. The operating shaft 20 in this case passes through the solid hub 40, which is axially supported on both sides, of a driven gear wheel 41 of the toothed gear mechanism 38. The internal cross-section of the hub 40, with a cavity identical to the passage cross-section 21, has the reference numeral 42. Toward the hub 40, this may be, seen in the axial direction, a lying fixed connection or else a displaceable association with respect to the driven gear wheel 41. The latter is preferred.

The drive element of the electric motor 37 is a worm 43. Associated with the said worm is an intermediate gear wheel 44, correspondingly realized as a worm wheel. Intermediate gear wheel 44 acts via a gear wheel 45 of smaller diameter on the driven gear wheel 41, which has the greatest diameter.

The toothed gear mechanism 38 includes the intermediate gear wheel 44 in paired association. The reference numerals are used analogously. In a corresponding way, there is also a further worm 43. The direction of the thread of the worms 43 is opposed, that is maintaining the direction. The intermediate gear wheels 44 perceptibly lie laterally offset from each other, lying on opposite sides of the electric motor shaft 39. This produces force introduction centers that are advantageous in terms of loading, since they are distributed. The electric motor shaft 39 is supported in an opposing manner at the sides. The step-down ratio is 210:1. The supply voltage is 12 V.

A gear casing 46, enclosing the internal components of the toothed gear mechanism 38, follows on to the left in FIG. 13 from the casing 47 of the electric motor 37. Altogether there is a bar-like basic body. The main reason for this is the axis of rotation 48 of the worm 43 or integral worms 43, which runs virtually in a longitudinally central manner and is in line with the axis of rotation 49 of the electric motor shaft 39. The geometrical axes run coaxially and spatially below the geometrical horizontal axis of the operating shaft 20. Instead of running below the plane of the operating shaft 20, the electric motor shaft 39 may also extend in the plane of the said operating shaft 20. The latter comprises a turning point for the overall electric motor/toothed gear mechanism body 37/38, projecting freely to the left. The toothed gear mechanism 38 and the electric motor 37 may also be installed in a combined casing.

The electric motor 37, that is substantially the winding region 50 of the electric motor 37 (stator and rotor), extends a good hand width away from the operating shaft 20, at the free end of which the entire unit is coupled on in a rotationally driving manner. The said casing-enclosed winding region 50 is of a substantially cylindrical shape that can be grasped by a hand. The casing 47 of the electric motor 37, going over into the winding region 50, can consequently be used as a freely projecting handle, so that this permits emergency operation of the roller 1 or rollers 1. More details on this follow further below.

With a view to the handle-forming association, the securing of the electric motor 37 at the extreme end of the operating shaft 20 is performed in such a way that the electric motor 37, aligned in its basic position in line with the beam 7 and connected to the chassis 2, possesses an alignment extending at right angles to the plane of the operating shaft 20. This is virtually identical to the electric motor shaft 39.

Depending on the dimensions of the chassis 2 determining the corner points with respect to the bed frame 5, the association with respect to the spatial position of the roller 1 or rollers 1 may be such that the electric motor 37 is disposed, for example with respect to a setup in a hospital bed. 3, on the outside of the bed in relation to a roller 1. On the other hand, however, an association such that the electric motor 37 is disposed, for example with respect to a setup in a hospital bed 3, on the inside of the bed in relation to a roller 1 can also be used.

The electric motor 37 can be used to bring about the functions shown in FIGS. 6, 8 and 10 with the aid of a controller by means of sensors. A storage battery 51 may serve as the own power source of the hospital bed 3. The said storage battery is carried and mounted on a bracket, extending from the beam 7 of the chassis 2. The power line connection independent from the supply system is suitably laid by using the spaces inside the hollow sections of the chassis 2.

The associated control device 52 is located on an outer side of one of the boards 6 of the hospital bed 3. It is likewise carried on a bracket, which has the reference symbol 53.

If the power source fails, for example because the charge of the storage battery 51 is depleted, the described functions can nevertheless be performed, in that the electric motor 37 is used as the switching lever or arm rotationally driving the operating shaft 20. This brings about the functionally determining turning of the control cam 19 of the roller 1. This consequently exploits the fact that, indeed for the emergency operation described, the electric motor 37 is disposed with the operating shaft 20 rotatably on the chassis 2 or carrier 9. A driven gear wheel 41, comprising as it were a screw wrench, of the toothed gear mechanism 38 does not produce reversible running. The step-down ratio described results in a self-locking toothed gear mechanism 39 of the electric motor 37.

In order, however, to be able to pivot the pivoting movement, going correspondingly about the geometrical horizontal axis of the operating shaft 20, of the handle-forming casing 47 of the electric motor 37, including a portion of the gear casing 46, the deliberate release of this pivoting movement going in the direction of the arrow z is required. This is so because, for emergency operation, secure mounting of this unit 46/47 first has to be relinquished.

A structural component of such a secure mounting is a spring pin 54 running spatially parallel to the operating shaft 20. The said spring pin is mounted in a guiding receptacle 55 of the gear casing 46. It is spatially located in the transitional region between the said casing 46 and the casing 47 of the electric motor 37. On the visible side, it ends as a waisted pull knob 56. The spring 57, loading the spring pin 54, is realized as a compression spring.

The spring 57 loads the spring pin 54 in the direction of a fixed bearing bore 58 in such a way that it can be overcome for release. The said bore extends congruently with respect to the guiding receptacle 55 and is formed in a lateral projection 59 of the carrier 9. The spring 57 perceptibly acts against an annular collar 60 on the foot of the spring ring 54. The spring abutment is located on the inner side, facing the carrier 9, of the gear casing 46. A recessed annular step may take effect here.

The gap between the carrier 9 and the gear casing 46 that is bridged by the spring pin 54, or its extended shank end, is designated by 61. This gap 61 is also crossed by the end of the operating shaft 20 held rotationally securely by the driven gear wheel 41.

A securing device for mounting the electric motor/gear mechanism unit in a way preventing it from being pulled off is designated by 62. It can, however, be deliberately detached for disassembly reasons.

After pulling the pull knob 56, releasing the pivotability of the electric motor 37, or even before, it is not necessary on account of an adequately dimensioned cable length to disconnect the cable connection to the electrical equipment, i.e. to disconnect a contact connector 63, the electric cable 64 of which leads to the electric motor or winding region 50 of the same. The horizontal insertion space formed on the lateral projection 59 has the reference numeral 65. It is connected to a line channel 66, which in spite of the cross-sectionally filling shape of the insertion projection 10, allows corresponding cable lead-throughs in the interior of the box section of the chassis 2.

FIG. 3 also clearly reveals that the carrier 9, including the insertion projection 10, is prepared for drawing in the operating shaft 20, to be precise in the form of a horizontal bearing eye 67 with the clear diameter of the point width of the hexagon of the shaft 20.

Using the power source in the form of the storage battery 51 and the control device 52, all four rollers 1 can each be fitted with an electric motor 37 of the type described, including the equipment for emergency operation.

However, the drawing shows one possibility to the effect that the operating shaft 20 simultaneously operates two rollers 1, lying next to each other, of a common arm 8 by means of only one electric motor 37. For this purpose, an operating shaft 20 of a corresponding length passes through the control cams 19 of two rollers 1 disposed at a distance from each other in the form of castor-type rollers. In a corresponding way, the end of the arm 8 that is remote from the electric motor 37 has a carrier 9 having a bearing eye 67. With regard to the insertion projection 10, the construction is identical. Otherwise, enhancing measures are taken, which are explained further below.

In order, however, to make all four rollers 1 controllable by means of one electric motor 37, the arm 8 at the rear in FIG. 1, i.e. lying on the left side, is also equipped as described. Using the beam 7, a drive mechanism 68 is also formed, comprising a thrust rod 69. The latter acts at the end via points of articulation 70 each on a lever arm 71 of the operating shaft 20. By means of such a drive mechanism 68, it is accordingly possible, by using two operating shafts 20 for simultaneous switching operation, to bring three or more rollers 1 synchronously into the respective functions by one electric motor 37.

In the region associated with the lever arm 71, a further supporting element with a bearing eye may be provided.

The carriers 9 occurring in a further version to this extent undertake as it were an adapter function.

Alternatively, with regard to the emergency operation referred to, it may also be provided that an extreme end of the operating shaft 20 is equipped with an operating handle. Such a handle is represented in FIG. 1 and designated by 72. The bearing eye 67 there is correspondingly passed through outwards. It is comparable to a keyhole. The manual operating handle 72 is suitably able to be pulled off.

While here, as it were, an axially fixed operating shaft 20 is assumed, a structurally simple variant of the emergency operation can also be achieved however by its axial displacement. The relevant operating shaft 20 is axially loaded by a spring 73. This takes place over a linear region of a polygonal portion a. The said portion is in a rotationally driving connection to the hub 40 of the driven gear wheel 41 of the electric motor 37. The functionally correct basic position is shown. If the positive engagement between the parts 20 and 41 is then to be relinquished, that is a release achieved with respect to the drive means of the electric motor 37 in the sense of unlatching, the operating shaft 20 is displaced counter to the force of the spring 73 to the left. As this happens, the region of the hub 40 is entered by a cylindrical portion b, which in terms of its diameter is less than the size of the width across flats of the hexagonal portion a of the operating shaft 20. Therefore, divorced from the self-locking influence of the electric motor 37, the operating shaft 20 can nevertheless be turned, doing so while performing the functions described above via the control cam or cams 19. The polygonal portion c lying to the right of the cylindrical portion b corresponds once again to that designated by a. The polygonal portion c may serve for the engagement of the manual operating handle 72, which corresponds in terms of its cross-section. This consequently achieves the effect that the operating shaft 20 has over its length not only an engaging portion, comprising the polygonal portion a, with which the toothed gear mechanism 38 interacts, but also a release portion, formed by the cylindrical portion b, and that the operating shaft 20 is displaceable in its longitudinal direction in relation to the toothed gear mechanism 38, so that, for emergency operation, a release portion, that is the cylindrical portion b, can be brought into association with the toothed gear mechanism 38. After pulling this manual operating handle 72, the operating shaft 20 moves speedily under spring loading back into its basic position, which can be seen from FIG. 13. The stop means of the operating shaft 20 are not represented, since they can easily be imagined.

Now back to the basic version, to take up the matter of the already indicated electrotechnical equipment: it is based on a sensor-controlled electrical fixing of the rollers. These means are accommodated in the carrier 9 remote from the electric motor 37 (you are referred to FIGS. 2 and 4). The insertion projection 10, here, too, offset to form a step or shoulder, has been introduced into the end of the arm 8 lying at the front on the right in FIG. 1. Seated inside the carrier 9 are the internal parts of the operating device B described with respect to FIGS. 6 et seq., as the main part the control cam designated by 19. Here, the end region of the operating shaft 20 is extended outward. It protrudes into the interior of an attachment 74, forming a casing, of the carrier 9 concerned. The attachment 74 lies on the side remote from the insertion projection 10 of the carrier 9, which itself is basically cuboidal.

The attachment 74 is open upward and at the extreme end, as well as at the bottom, so that it is accessible for fitting components, in particular at the end and bottom. The end opening has the reference numeral 75. The bottom opening is designated by 76.

A cylindrical roll 78 can be introduced via the end opening 75 into the cavity 77 of the attachment 74. The said roll can be inserted over its entire length. It has, situated in a longitudinally directed manner in the center, a continuous internal cross-section 79. This is cross-sectionally made to match the cross-section of the end there of the operating shaft 20. There is consequently positive engagement with a corresponding rotationally driving effect. The axially correct fixing suitably takes place by means of a grub screw, the radially directed threaded bore of which on the roll side is revealed by FIG. 4.

Consequently, disposed on the operating shaft 20, indirectly associated with it, are position indicators 80, distributed circumferentially on the roll 78. The position indicators 80 are formed as magnets. They are shaped in the form of pins. Their center axes lie in radials. To receive the magnets, or position indicators 80, the roll 78 has matching pockets 81, opening toward the outer wall.

Altogether, three position indicators 80 are provided on the roll 78, covering the functions mentioned above, such as pivoting blockage (cf. FIG. 6), release position (cf. FIG. 8), braking and pivoting blockage (cf. FIG. 10). An overall rotational angle of the operating shaft 20 or roll 78 of less than 180° is sufficient for this. According to the exemplary embodiment represented, the three position indicators 80 are even accommodated within an overall rotational angle of 90°. This can be reduced still further, for example to 60°.

The individual position indicators 80 extend in the longitudinal direction of the operating shaft 20, but also with axial spacing from one another. The angular spacings between respective position indicators 80 in the case of the exemplary embodiment represented are substantially 45°, as indicated reducible even to 30°. The position indicators 80, exposed in the manner of cylinders of music boxes, extend virtually on an imaginary helix on the circumference of the roll 78, whilst taking into account the axial offset.

The detection plane lies vertically and insects the geometrical axis of the operating shaft 20.

An end wall 82 lying opposite the said end opening 75 axially on the carrier side comprises, with respect to a concentric collar 83 on the inner side of the roll 78, an axial limiting stop for the actuating shaft 20 fitted with the roll.

A stop in the opposite direction, that is counteracting, is obtained on the side of the operating shaft 20 having the electric motor 37 by a cap, also playing a part in forming the securing device 62 mentioned above. On the other side, facing the carrier 9, of the electric motor 37, a collar 84 is formed onto the gear casing 46, protruding in the direction of the gap 61. Lying opposite this collar 84 is a stub 85 of the carrier 9 there. The shaft 20 is axially secured.

Locationally fixed position sensors 86 serve for detecting the switching positions of the operating shaft 20 or the described roller functions. The position indicators 80 pass contactlessly over these sensors. The position sensors are formed as proximity switches and are accommodated in a common circuit board 87. You are referred to FIG. 5. The circuit board 87 is shown enlarged there.

The position sensors 86 are also disposed with axial spacing from one another over the length of the operating shaft 20. This spacing corresponds to that of the position indicators 80, only that the former are linearly positioned only in an axially oriented manner.

The circuit board 87 shown enlarged in FIG. 5 is associated with the opening at the bottom, designated by 76, by way of transverse insertion. The transversely oriented vertical wall portions of the bottom opening 76 have for this purpose longitudinal grooves (not represented), which guide, or grasp, the corresponding edges of the circuit board 87. Securing means may keep the circuit board 87 in the operationally correct position.

As already indicated, the power supply to the control device 52 takes place by the storage battery 51. In this respect it is taken into account in switching terms that, after operation of the roller 1, to be triggered by means of the switching device, the switching device always completely interrupts the power supply to the storage battery 51 again. This proves to have a significant energy-saving effect. For the next-following function, i.e. before carrying out a functionally related operation of the roller 1 by means of the switching device, separate activation of the power supply to the switching device always has to be carried out. It is also possible in each case here to read the current function, so that the user can see directly whether the function chosen by him has not already been chosen. Consequently, activation of the power supply to the switching device is accompanied by an indication of the operating state of the roller 1.

Furthermore, it is provided that the switching units of the switching device/control device 52 are likewise disposed on a common circuit board.

With multiple use of electric motors 37, the configuration is advantageously such that two or more rollers 1 are intended for joint operation and that each roller 1 has an associated operating shaft 20 of its own and electric motor 37 of its own. Here, too, the operation of the electric motors 37 follows by means of a central control unit. It is in operative connection with each of the electric motors 37.

The operating elements of the control device 52, comprising various buttons, are grouped together in a clear layout on its front plate 88, sloping down like a desk. By operating a button 89, the control device 52 switches into the standby mode. This is indicated by a light-emitting diode 90 (for example green). By means of another button 91, the standby mode is switched off again. In FIGS. 6 and 7, the pivoting blockage is switched. For this purpose, a pivoting blockage button 92 is pressed. This produces the electrical fixing of the direction, under sensor control. This is also optically/visually perceptible to the side of the pivoting blockage button 92 by a light-emitting diode. FIGS. 8 and 9 show the release position of the roller 1, correspondingly reached under sensor control. For this purpose, the release button, designated by 93, is pressed. A light-emitting diode disposed next to it makes this situation perceptible in the way stated. The control cam 19 is moved counterclockwise. The electrical adjusting drive moves into the position represented.

FIGS. 10 and 11 show the braking and pivoting blockage. To achieve this total stop, the braking and pivoting blockage button, designated by 94, is pressed. Here, too, the optical/visual indication of this function takes place to the side.

The three functions described can also be manually brought about in the event of a fault, by the measures discussed in detail further above. After corresponding unlocking of the electric motor 37, it can be brought out of its horizontal, freely projecting extent into an angle bisector to the vertical and from there into a vertical position, as it does so passing through the respective switching steps.

As FIGS. 1 and 6 et seq. reveal, the free space necessary for the pivoting operation is provided by an adequate vertical low-level region 14. Even a differently directed pivoting movement, that is clockwise, is possible, since there is adequate free space between the upper side of the chassis 2 and the underside of the bed frame 5 as a result of the superstructure designated by 15.

With regard to the storage battery 51, it remains to be noted that this has an on/off rocker switch, and also a capacitive charge indicator and a connection for a power supply system connector, so that the supply to the control device can also take place by this means.

The electrics operate extremely economically, since the control device switches off after each newly set function.

All disclosed features are (in themselves) pertinent to the invention. The disclosure content of the associated/attached priority documents (copy of the prior patent application) is also hereby incorporated in full in the disclosure of the patent application, including for the purpose of incorporating features of these documents in claims of the present application.

The invention claimed is:

1. Roller (1), suitable for use as a castor of a hospital bed, with rotational movement of a running wheel (12), the roller comprising: the running wheel (12), a control cam (19), a toothed gear mechanism (38), and an operating shaft (20) which passes through the control cam (19) of the roller (1) to engage with a shaft (39) of an electric motor (37), wherein the shaft (39) of the electric motor (37) connects via the gear mechanism to the operating shaft (20) to operate the cam, the toothed gear mechanism (38) having a driven gear wheel (41), a hub (40) of which is passed through by the operating shaft (20), and two intermediate gear wheels (44) on opposite sides of the electric motor shaft (39); and wherein a portion of the operating shaft (20) is configured for disengagement from the toothed gear mechanism (38) to permit manual rotation of the operating shaft (20) upon axial displacement of the operating shaft (20) relative to a gear of the toothed gear mechanism (20).

2. Roller according to claim 1, wherein the operating shaft (20) has a polygonal cross-section.

3. Roller according to claim 1, wherein the hub (40) has an internal cross-section (42) that is adapted to a polygonal cross-section of the operating shaft (20).

4. Roller according to claim 1, wherein the toothed gear mechanism (38) has a worm (43), which drives the driven gear wheel (41) via step-down intermediate gear wheels (44).

5. Roller according to claim 4, wherein an axis of rotation (48) of the worm (43) is in line with an axis of rotation (49) of the electric motor shaft (39).

6. Roller according to claim 1, wherein the operating shaft (20) is displaceable in relation to the hub (40) in longitudinal direction of the operating shaft (20) of the driven gear wheel (41).

7. Roller assembly comprising a first roller and a second roller, each of said rollers being according to claim 1, wherein the operating shaft (20) passes through the control cams (19) of respective ones of said first and said second rollers (1) disposed at a distance from each other.

8. Roller assembly according to claim 7, further comprising said electric motor (37) of claim 1, and a third roller according to claim 1, wherein two said operating shafts (20) from respective ones of said first and said second rollers are disposed parallel to each other and are coupled by means of a drive mechanism (68) for simultaneous switching operation of at least three of said rollers (1) by one said electric motor (37).

9. Roller assembly according to claim 8, wherein said electric motor (37) is fixed, and said electric motor shaft (39) extends at a right angle to a plane of the two parallel operating shafts (20).

10. Roller assembly according to claim 9, wherein said fixed electric motor (37) is in or below the plane of the operating shafts (20).

11. Roller according to claim 1, wherein the electric motor (37) is connected with an extreme end of the operating shaft (20).

12. Roller according to claim 1, wherein the electric motor (37) is disposed with respect to a setup in a hospital bed (3), on an outside of the bed in relation to the roller (1).

13. Roller according to claim 1, wherein the electric motor (37) is disposed with respect to a setup in a hospital bed (3), on an inside of the bed in relation to the roller (1).

14. Roller according to claim 1, further comprising a set of sensors for detecting switching positions of the operating shaft (20), the sensors serving as switching units of a switching device for electrical activation of the motor, the switching units being disposed on a common switching circuit board.

15. Roller according to claim 14, wherein said switching circuit board is integrated into an existing switching unit of a hospital bed (3).

16. Roller according to claim 1, wherein pivoting movement of the running wheel (12) is fixable.

17. Roller (1), suitable for a castor, with rotational movement of a running wheel (12), the roller comprising: a control cam (19), an electric motor (37), a toothed gear mechanism (38), and an operating shaft (20) which passes through the control cam (19) of the roller (1), wherein a shaft (39) of the electric motor (37) connects via the gear mechanism to the operating shaft (20) to operate the cam, the toothed gear mechanism (38) having a driven gear wheel (41), a hub (40) of which is passed through by the operating shaft (20); and wherein the electric motor has a casing (47), the casing of the electric motor extending into and being rotatable within a winding region (50), the casing being formed such that it projects freely from the roller; and wherein the electric motor is disposed with respect to a setup in a hospital bed (3), the electric motor being on an outside of the hospital bed in relation to the roller.

18. Roller according to claim 17, wherein the casing (47) of the electric motor (37), covering a stator winding region (50) of the motor, is formed as a projection from the roller, which projection may serve as a handle.

19. Roller according to claim 18, wherein the projection of the casing of the electric motor (37) is disposed rotatably about an axis of the operating shaft.

20. Roller according to claim 19, wherein secure mounting of the electric motor (37) is relinquishable for emergency operation.

21. Roller according to claim 20, wherein a spring pin (54) engages in a fixed bearing bore (58) for fixed mounting.

22. Roller (1), suitable for a castor, with rotational movement of a running wheel (12), the roller comprising: the running wheel (12), a control cam (19), an electric motor (37), a toothed gear mechanism (38), and an operating shaft (20) which passes through the control cam (19) of the roller (1), to encage with a shaft (39) of the electric motor (37), wherein the shaft (39) of the electric motor (37) connects via the gear mechanism to the operating shaft (20) to operate the cam, the toothed gear mechanism (38) having a driven gear wheel (41), a hub (40) of which is passed through by the operating shaft (20); and wherein the toothed gear mechanism (38) of the electric motor (37) is self-locking to permit manual rotation of the operating shaft (20) by a manual rotation of a casing of the motor in the absence of electric power.

23. Roller assembly comprising a first roller and a second roller, each of said rollers being according to claim 1, wherein at least two of said rollers (1) are intended for joint operation, and wherein each of said rollers (1) has an associated said electric motor (37) of its own, the operating of the electric motors (37) taking place via a central control unit, which is in operative connection with each of the electric motors (37).

24. Roller (1), suitable for use as a castor, with rotational movement of a running wheel (12), the roller comprising: the running wheel (12), a control com (19), a toothed gear mechanism (38), and an operating shaft (20) which passes through the control cam (19) of the roller (1) to engage with a shaft (39) of an electric motor (37), wherein the shaft (39) of the electric motor (37) connects via the gear mechanism to the operating shaft (20) to operate the cam, the toothed gear mechanism (38) having a driven near wheel (41), a hub (40) of which is passed through by the operating shaft (20), and two intermediate gear wheels (44) on opposite sides of the electric motor shaft (39); and wherein the operating shaft (20) has over its length not only an engaging portion with which the toothed gear mechanism (38) interacts, but also a release portion and, wherein the operating shaft (20) is displaceable in its longitudinal direction in relation to the toothed gear mechanism (38), so that, for emergency operation, the release portion is bringable into association with the toothed gear mechanism (38).

25. Roller according to claim 24, wherein an extreme end of the operating shaft (20) is provided with a manual operating handle (72).

26. Roller according to claim 25, wherein the operating shaft (20) is axially movable against spring force by means of the manual operating handle (72).

27. Roller (1), suitable for a castor, with rotational movement of a running wheel (12), the roller comprising: the running wheel, a control cam (19), an electric motor (37), a self-locking gear mechanism, and an operating shaft (20) which passes through the control cam (19), wherein the electric motor (37) acts on the operating shaft via the gear mechanism to operate the cam, wherein the electric motor (37) has a casing which is formed as a projection from the roller, which projection may serve as a handle for rotation of the operating shaft in the absence of electric power to the motor, the rotation of the operating shaft being enabled by the self-locking of the gear mechanism.

28. Roller (1), suitable for a castor, with rotational movement of a running wheel (12), the roller comprising: the running wheel, a control cam (19), an electric motor (37), a self-locking gear mechanism, and an operating shaft (20) which passes through the control cam (19), wherein the electric motor (37) acts on the operating shaft via the gear mechanism to operate the cam, wherein the electric motor (37) is disposed with the axis of rotation of its motor shaft (39) being perpendicular to the axis of the operating shaft (20) for rotating a casing of the motor manually about the axis of the operating shaft.

29. Roller (1), suitable for a castor, with rotational movement of a running wheel (12), the roller comprising: a control cam (19), an electric motor (37), a toothed gear mechanism (38), and an operating shaft (20) which passes through the control cam (19) of the roller (1), wherein a shaft (39) of the electric motor (37) connects via the gear mechanism to the operating shaft (20) to operate the cam, the toothed gear mechanism (38) having a driven gear wheel (41), a hub (40) of which is passed through by the operating shaft (20); and wherein the roller further comprises a push rod, operated by the cam to place the roller in an operating mode and wherein the electric motor has a casing (47), the casing of the electric motor extending into and being rotatable within a winding region (50), the casing being formed such that it projects freely from the roller; and wherein the electric motor is disposed with respect to a setup in a hospital bed (3), the electric motor being on an outside of the hospital bed in relation to the roller.

30. A roller according to claim 29 wherein there is a plurality of operating modes including an enablement of a pivoting of the running wheel and a braking of the running wheel.

* * * * *